F. L. HICKS.
Improvement in Fruit Gatherers.
No. 123,630. Patented Feb. 13, 1872.
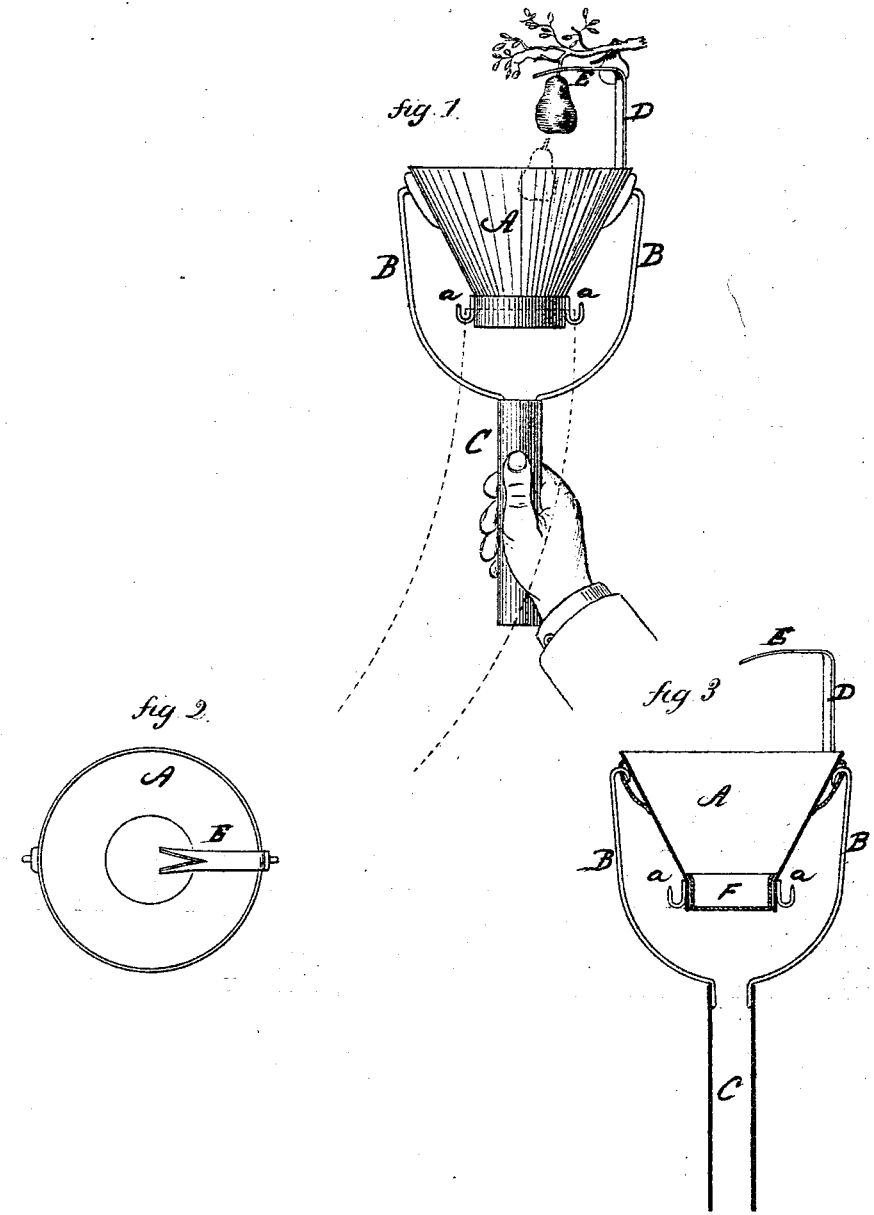

UNITED STATES PATENT OFFICE.

FRANKLIN L. HICKS, OF NEW HAVEN, CONNECTICUT, ASSIGNOR TO HIMSELF AND OLIVER M. FERGUSON, OF SAME PLACE.

IMPROVEMENT IN FRUIT-GATHERERS.

Specification forming part of Letters Patent No. 123,630, dated February 13, 1872.

*To all whom it may concern:*

Be it known that I, FRANKLIN L. HICKS, of New Haven, in the county of New Haven and State of Connecticut, have invented a new Improvement in Fruit-Picker; and I do hereby declare the following, when taken in connection with the accompanying drawing and the letters of reference marked thereon, to be a full, clear, and exact description of the same, and which said drawing constitutes part of this specification and represents, in—

Figure 1, a side view as in operation; Fig. 2, a top view; and in Fig. 3, a vertical central section.

This invention relates to a device for picking fruit, the object being the construction of an implement whereby the fruit may be taken from the tree without injury by the person standing upon the ground; and my invention consists in the arrangement of a receiver pivoted in a yoke, so as to always maintain a vertical position, provided with a fixed cutter for separating the fruit from the branch, and also with a removable bottom, whereby, if desirable, a tube may be attached to conduct the fruit to the receptacle.

A is the receptacle, by preference made of conical form, and hung in a yoke or fork, B B, and so as to swing freely, whereby it maintains a vertical position. The fork is attached to a handle, C, which extends down to the hand of the person using the implement. From the top of the receiver I extend upward a post, D, from which extends inward the cutter E. This cutter is forked, as seen in Fig. 2, so that the person picking the fruit passes the cutter on to the stem of the fruit, as seen in Fig. 1, the edges of the cutter separating the fruit from the branch, so that it will fall into the receiver, as seen in Fig. 1. The bottom F is inserted from the inside and made removable, and the outside provided with hooks *a a*, or other device, by which a tube may be attached thereto, so that when the bottom is removed the fruit will pass through the tube into the receptacle below.

One great advantage of this device over others consists in the fact that no extra mechanism is required to clip the fruit from the branch, the forked shape of the cutter serving, with very little effort on the part of the operator, and with the same hand that holds the staff, to separate the fruit from the branch.

I claim as my invention—

The receiver A, supported in the fork B B from the handle C, and provided with the fixed forked cutter E, substantially in the manner set forth.

F. L. HICKS.

Witnesses:
JOHN E. EARL,
JOHN H. SHUMWAY.